United States Patent [19]
Hayden et al.

[11] Patent Number: 5,731,539
[45] Date of Patent: Mar. 24, 1998

[54] TARGET DETECTION METHOD

[75] Inventors: Rhett Garrett Hayden, Scottsdale; Timothy Edmund Casey, Phoenix; Douglas Wade Hill, Scottsdale, all of Ariz.

[73] Assignee: Motorola, Inc., Schaumburg, Ill.

[21] Appl. No.: 955,584

[22] Filed: Oct. 2, 1992

[51] Int. Cl.[6] .............................. F42C 13/00; G06K 9/00
[52] U.S. Cl. ................................................ 102/211; 382/1
[58] Field of Search ........................... 102/211; 244/3.15, 244/3.16; 382/1, 48

[56] References Cited

U.S. PATENT DOCUMENTS

| | | | |
|---|---|---|---|
| 4,383,663 | 5/1983 | Nichols | 244/3.16 |
| 4,499,597 | 2/1985 | Alves | 382/41 |
| 5,027,413 | 6/1991 | Barnard | 382/1 |
| 5,103,484 | 4/1992 | Stafford et al. | 382/1 |
| 5,150,426 | 9/1992 | Banh et al. | 382/48 |

*Primary Examiner*—Ian J. Lobo
*Attorney, Agent, or Firm*—Frank J. Bogacz

[57] ABSTRACT

A target detection method collects spatial data relating to a target at an instant in time. This data is converted to an appropriate coordinate system, such as Cartesian coordinates. A centroid of the target is determined. Predictions of the centroid are made at subsequent time intervals. The predicted centroids are averaged with the current determined centroids. When the closest centroid position of the target is determined, an indication is provided for detonating the warhead of a projectile.

21 Claims, 4 Drawing Sheets

U.S. Patent   Mar. 24, 1998   Sheet 1 of 4   5,731,539
FIG. 1
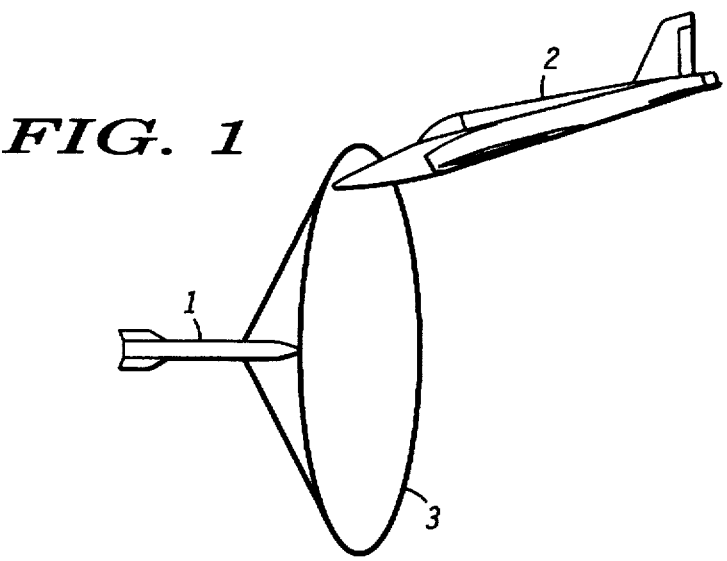
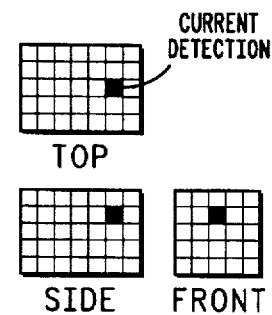
FIG. 4
FIG. 2
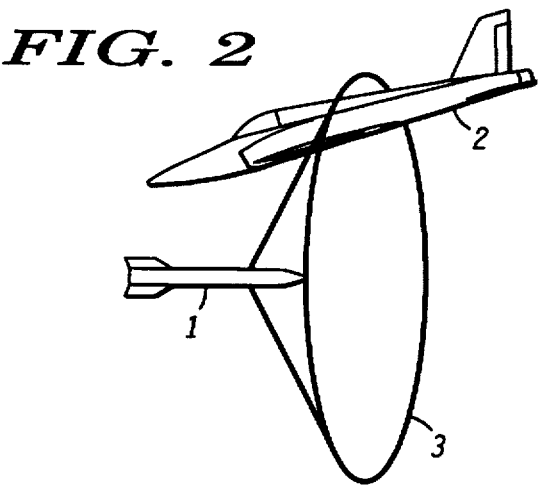
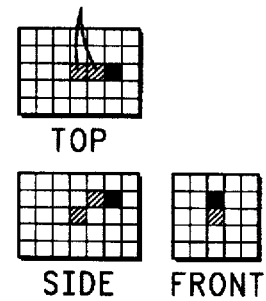
FIG. 5
FIG. 3
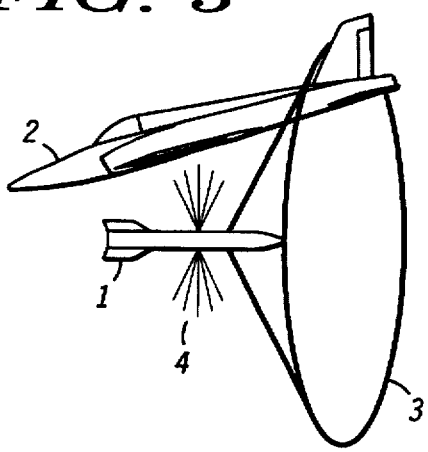
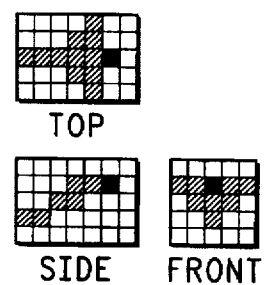
FIG. 6

5,731,539

TARGET DETECTION METHOD

LICENSE RIGHTS

The U.S. Government has a paid-up license in this invention and the right in limited circumstances to require the patent owner to license others on reasonable terms as provided for by the terms of Contract No. F08635-90-C-0039 awarded by the United States Air Force.

BACKGROUND OF THE INVENTION

The present invention pertains to fuzing for missile or projectile warheads and more particularly to a centroid target detection method.

Air target missiles are required to attack a greater variety of targets while under more diverse conditions. Such targets are becoming both smaller and more agile. Therefore, a missile or projectile must position itself significantly more accurately to the target in order to place explosive fragments on or near the target to achieve the desired target lethality. Further, due to smaller missiles and smaller warheads of smaller missiles, the placement of the explosive fragments must be in the most vulnerable regions of the target to insure target destruction. The increasing variety of targets, such as missiles, fighters, and bombers, increased hardness and increased maneuverability of such targets require more complex processing in order for the missile to recognize the target size, its orientation, and the location of the most vulnerable area. The fundamental problem, therefore, is to locate the most vulnerable region within the target in order to place explosive fragments in that region by maximizing the warhead's lethality.

Certain target detection systems attempt to determine the time centroid of the target. Other target location systems form "offsets" from a single detection of the target.

It would be highly desirable to find the centroid of the target with a high degree of precision over time to provide for maximum target lethality.

SUMMARY OF THE INVENTION

In accordance with the present invention, a novel target detection method is shown.

In a fuzing arrangement of a missile, a target detection method comprises the step of receiving ranging, elevation, and azimuth information relating to a detected target at a particular time. Next, the information is converted to a plurality of orthogonal planes of Cartesian coordinates. The time period is incremented and subsequent information is received and converted for a number of times. Cartesian coordinates of the centroid of the target are predicted. The predicted centroid in Cartesian coordinates is combined with the currently measured centroid of the target. An indication is provided to the fuzing arrangement when the centroid of the target is in close proximity to the missile.

BRIEF DESCRIPTION OF THE DRAWINGS

FIG. 1 is a diagramatic view of an initial target detection by a missile in accordance with the present invention.

FIG. 2 is a plan view of target tracking by a missile in accordance with the present invention.

FIG. 3 is a plan view of a warhead detonation by a missile in accordance with the present invention.

FIG. 4 is top, side, and front views of the data from the initial target detection of FIG. 1.

FIG. 5 is top, side, and front views of the data from the target tracking of FIG. 2.

FIG. 6 is top, side, and front views of the data at warhead detonation of FIG. 3.

DESCRIPTION OF THE PREFERRED EMBODIMENT

FIGS. 1–3 illustrate the key events during a missile/target aircraft encounter. FIGS. 4–6 correspond to FIGS. 1–3. FIGS. 4–6 show reflected radar projections of the target detection onto three orthogonal Cartesian planes (the top, the side, and the front). FIGS. 4–6 represent coarse grids superimposed upon each Cartesian view of the target detection. The optical or RF radar sensors categorize the returns into the gratings or bins as shown in FIGS. 4–6. The dark bins indicate current target detections whereas the cross-hatched squares represent predicted values of previous detections.

FIG. 1 depicts the initial target detection by missile or projectile 1 of target 2. Missile 1 projects a cone-shaped radar detection beam 3. Multiple non-overlapping detection beams may be employed by missile 1. A typical configuration is two beams, a fore and an aft detection beam. For simplicity of explanation, only a single cone radar beam 3 is shown, although a number of detection beams may be used. As target 2 first penetrates beam 3, radar returns are sent to missile 1 and the current detections are as shown from the top, the side, and front views in FIG. 4.

FIG. 2 depicts further penetration by target 2 of beam 3. FIG. 5 corresponding to the activities of FIG. 2 depicts cross-hatched bins in addition to the dark bins of the current detection. The cross-hatched bins indicate predicted values based upon the previous detections. The view of FIG. 5 indicates that more of the target 2 is coming into view of beam 3. The relative movement of missile 1 and target 2 is bringing them closer together. The target detection method of missile 1 is attempting to estimate the location of the centroid of target 2 so that detonation of the warhead may cause maximum lethality to target 2.

In FIG. 3, warhead detonation of missile 1 is depicted. FIG. 6 depicts the three orthogonal Cartesian coordinate planes corresponding to the event of FIG. 3. The cross-hatched areas again show predicted values of previous detections. Note that the top and front views present an outline of the target 2 as shown in FIG. 3. As a result of these predictions, the target detection method estimates when the centroid of the target 2 will be at the closest possible proximity to missile 1 and its direction from the missile 1 so that warhead fragments reach the most vulnerable area of target 2 and provide the indication to the fuzing arrangement (not shown) to detonate the warhead thereby projecting fragments to defeat target 2.

Figure 7:
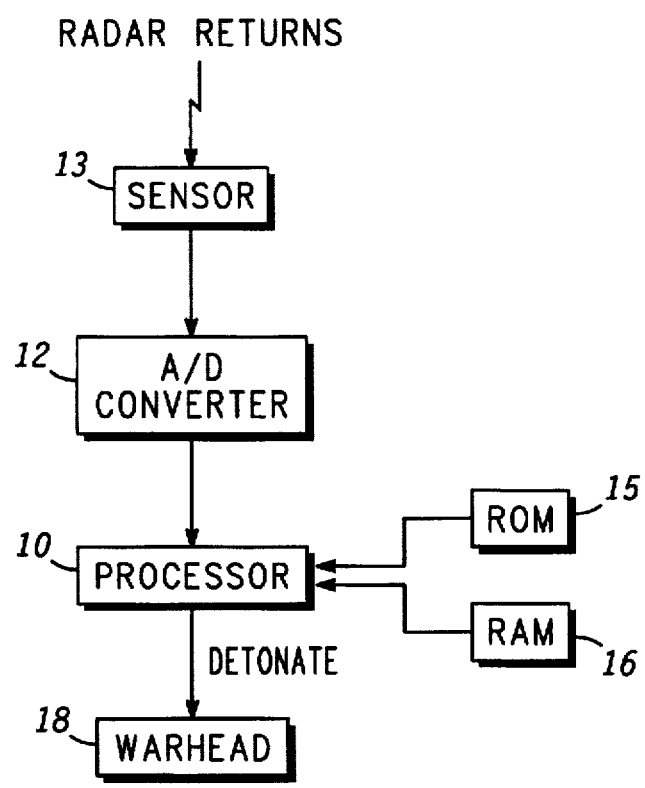
FIG. 7 is a block diagram of the processing arrangement for executing the target detection method in accordance with the present invention.

FIG. 7 depicts the control system for the target detection method. The heart of the system is processor 10 which controls the reception of data recognition of the target and detonation of the warhead. Processor 10 may be implemented with a Motorola 68000 family CPUs or equivalents. Analog-to-digital (A/D) converter 12 is coupled to processor 10. Sensor 13 which receives the radar returns is coupled to A/D converter 12. ROM memory 15 and RAM memory 16 are each coupled to processor 10. Processor 10 may read from ROM memory 15 only. Processor 10 may read or write to or from RAM memory 15. Processor 10 is also coupled via the detonate lead to warhead 18.

The radar returns which represent analog data reflected by a target from beam 3 are received by sensor 13. These radar returns are quantized into particular bins and transmitted to A/D converter 12. A/D converter 12 converts the radar returns to a digital form suitable for processing by processor 10. Sensor 13 may comprise radio frequency (RF) or optical active radar sensors. ROM 15 includes the target detection method software. The target detection software is used by processor 10 to determine when the centroid of the target is in closest (best) proximity to the missile. RAM memory 16 stores data from one target detection step to another target detection step. The time between target detection steps is approximately 0.5 milliseconds, but may vary with the operational situation. Therefore, all estimation and prediction of target location is required to be complete within each step. The target detection computations run continuously from one step to the next. After successive times of estimating the centroid of the target, the target detection method will operate via processor 10 to determine that the centroid of the target is at the best possible position with respect to the missile and provide the detonate indication via the detonate lead to warhead 18. This generation of the detonate indication also includes the time for the fragments to deploy so as to disable the target.

The missile fuze of which the target detection method is a portion reports spherical coordinates with respect to radar returns comprising range R, azimuth $\Phi$, and elevation $\theta$ at time T from the active detection beam sensor. Although FIGS. 1-3 depicted only a single beam for simplicity, the remainder of the application shall deal with dual beams (a fore beam and an aft beam).

Figure 8:
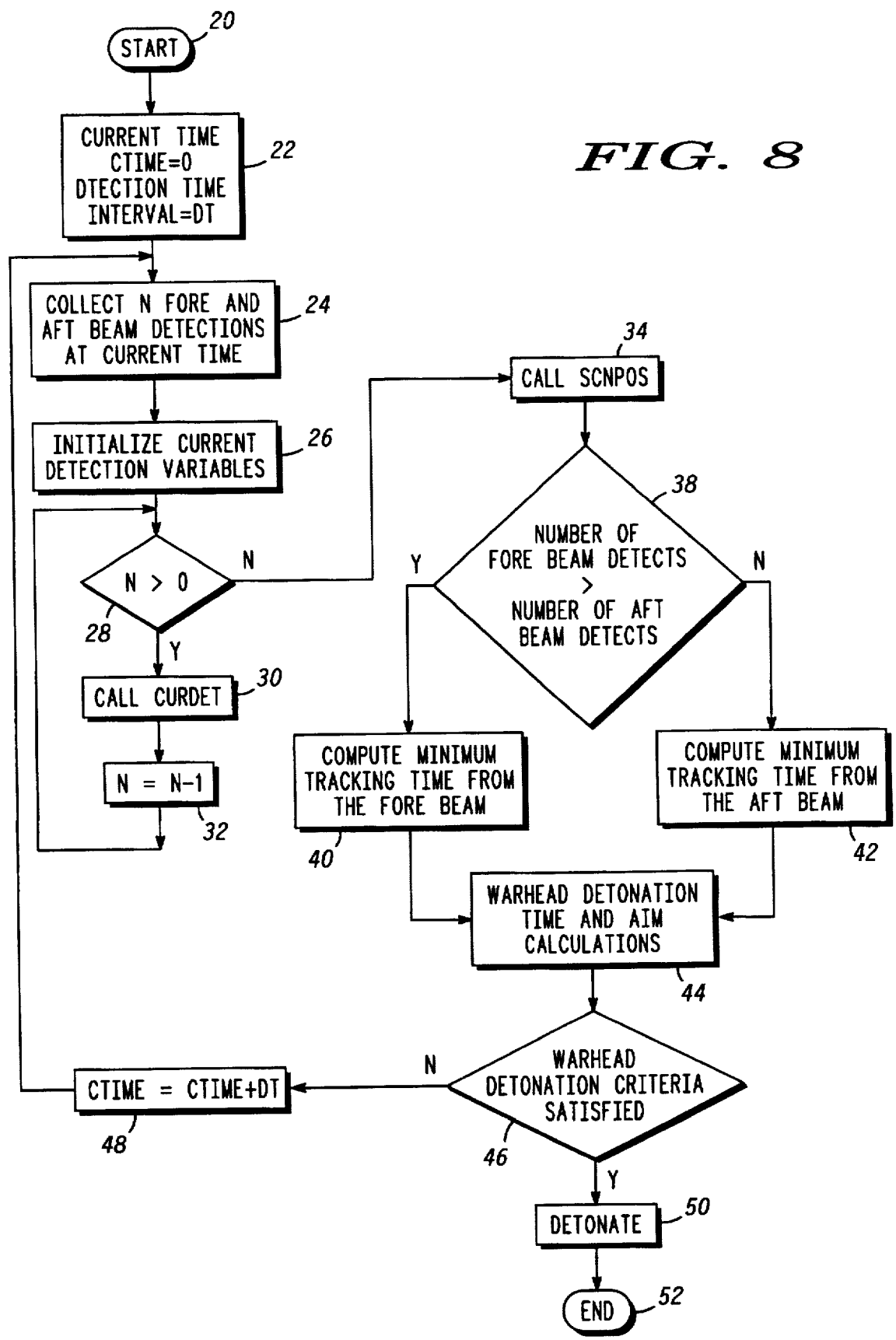
FIG. 8 is a flow chart of the method for target detection in accordance with the present invention.

The target detection algorithm is shown in FIG. 8. When the algorithm is initiated after the first time a target is detected, the start block 20 is entered and control is transferred to block 22. The current time, CTIME is set equal to zero and the detection time interval is set equal to the initial value DT, block 22. Next, block 24 collects N fore and aft beam detections at the current time.

Next, the current detection variables are initialized, block 26.

Next, block 28 determines whether N is greater than zero; that is, whether or not there is a detection at the current time. If N is greater than zero, block 28 transfers control to block 30 via the YES path. Block 30 calls the CURDET subroutine.

Figure 9:
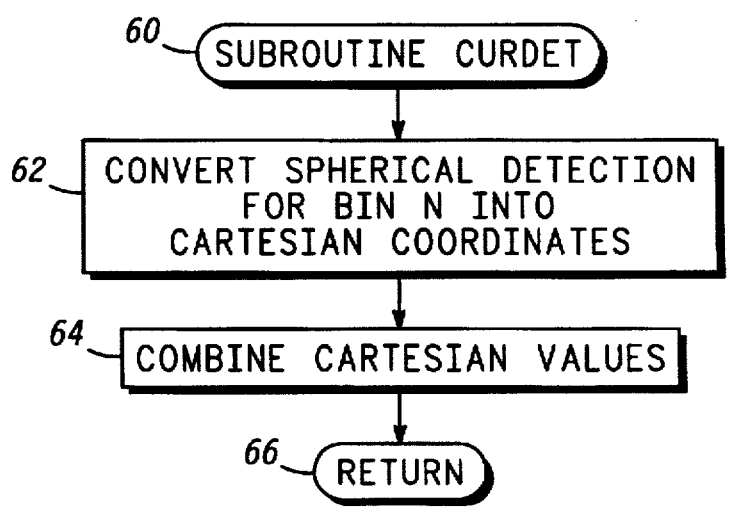
FIG. 9 is a flow chart of the CURDET subroutine of FIG. 8.

Referring to FIG. 9, subroutine CURDET is shown. When subroutine CURDET is called by block 30, block 60 is entered and control is transferred to block 62. Block 62 converts the spherical detection coordinates R, $\Phi$ and $\theta$ for bin N into Cartesian coordinates using the transformations shown in Equations (1). The current set of range, azimuth, and elevation readings obtained by the sensor fills $N_0$ bins of the coarse grids and N is set to $N_0$ initially. The set of readings $N_0$ is taken at time $T_0$ from the active detection beam. Next, block 64 combines the Cartesian coordinate values from the $N_0$ bins.

$X=R*COS(\theta)$ $Y=R*SIN(\theta)*COS(\Phi)$ $Z=R*SIN(\theta)*SIN(\Phi)$ \hfill Equation (1)

The subroutine CURDET then returns via block 66 to block 30. Block 30 then transfers control to block 32. Block 32 subtracts 1 from N and transfers control to block 28. Block 28 again determines whether N is greater than zero and if so, repeats the conversion of spherical coordinates to Cartesian and combines the Cartesian values. The conclusion of this process which occurs when N equals zero is the set of sums over the $N_0$ readings shown in Equation (2).

$X_{0s} = \sum_{i=1}^{N} X_i; Y_{0s} = \sum_{i=1}^{N} Y_i; Z_{0s} = \sum_{i=1}^{N} Z_i$ \hfill Equations (2)

Figure 10:
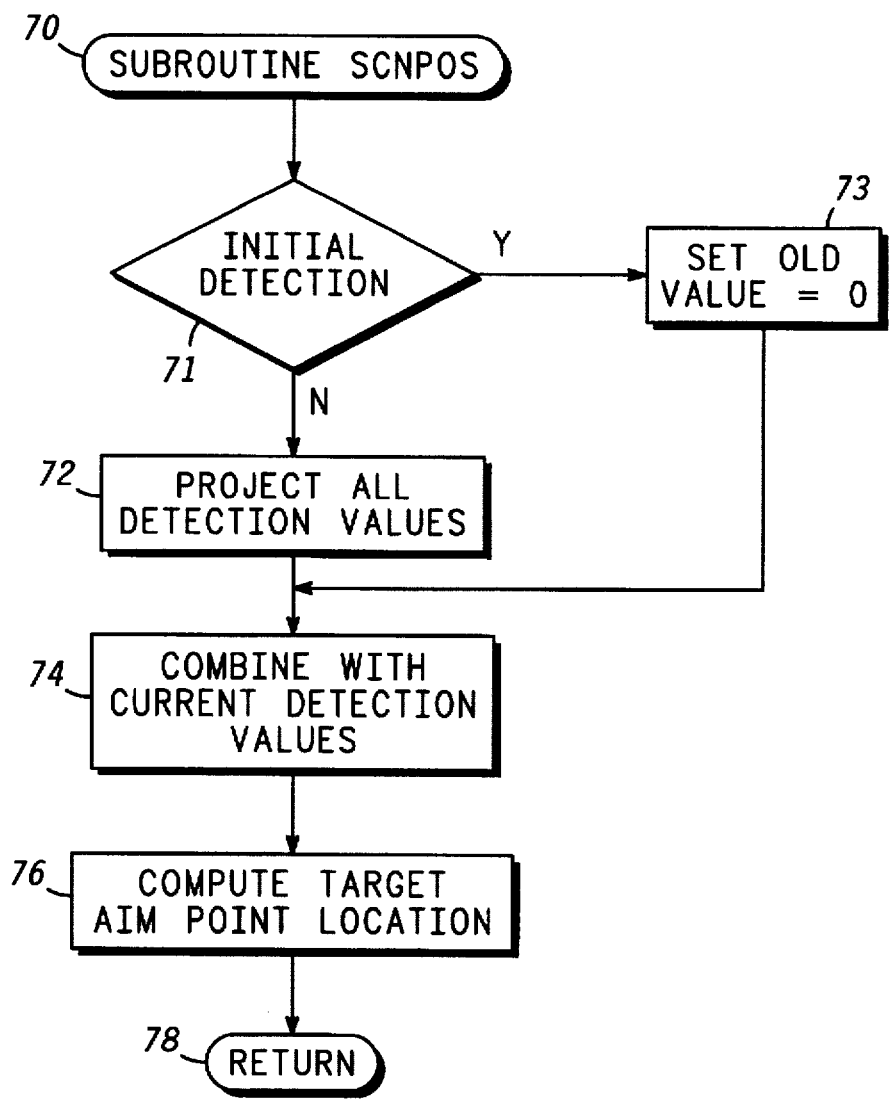
FIG. 10 is a flow chart of the SCNPOS subroutine in accordance with FIG. 8.

When N is no longer greater than zero, block 28 transfers control to block 34 via the NO path. Block 34 calls the SCNPOS subroutine. Referring to FIG. 10, the SCNPOS subroutine is shown. Subroutine SCNPOS is entered at block 70, FIG. 10 and control is transferred to block 71. Block 71 tests whether this is the initial detection of the target. If this is the first detection, control passes to block 73 which sets the old detection values to zero. If not, control passes to block 72 which projects the previous or old detection values along the relative velocity vector by a distance corresponding to the elapsed time, DT, between the samples at $T_0$ and $T_1$ according to Equations (3), where $N_1$ represents the total number of previous detections. The previous Cartesian components are: $X_{1s}$, $Y_{1s}$, and $Z_{1s}$.

$X'_{1s}=X_{1s}+DT*Vtmx*N_1$ $Y'_{1s}=Y_{1s}+DT*Vtmy*N_1$ $Z'_{1s}=Z_{1s}+DT*Vtmz*N_1$ \hfill Equation (3)

where $DT=T_0-T_1$.

Block 74 combines the projected position of the target with the current position of the target to produce at Time $T_0$ an estimate of target position via Equations (4).

$X'_{0s}=X_{0s}+X'_{1s}$ $Y'_{0s}=Y_{0s}+Y'_{1s}$ $Z'_{0s}=Z_{0s}+Z'_{1s}$ \hfill Equation (4)

Block 76 determines the centroid of the target by Equations (5).

$X_{0c} = \dfrac{X_{0s}}{N_0+N_1}$ ; $Y_{0c} = \dfrac{Y_{0s}}{N_0+N_1}$ ; $Z_{0c} = \dfrac{Z_{0s}}{N_0+N_1}$ \hfill Equations (5)

Block 78 then returns to block 34.

Block 34 transfers control to block 38. Block 38 determines whether the number of fore beam detections is greater than the number of aft beam detections. If the number of fore beam detections is greater, block 38 transfers control to block 40 via the YES path. Block 40 computes the minimum tracking time for the target from the fore beam cone and transfers control to block 44. If the number of fore beam detections is less than or equal to the number of aft beam detections of the target, block 38 transfers control to block 42 via the NO path. Block 42 computes the minimum tracking time for the target from the aft beam. Block 42 then transfers control to block 44.

Block 44 performs the aim calculations and warhead detonation timing and aiming calculations. Block 46 then determines whether the warhead detonation criteria are satisfied. If they are not satisfied, block 46 transfers control to block 48 via the NO path. If the warhead detonation criteria are satisfied, block 46 transfers control to block 50 via the YES path. Block 50 detonates the warhead of the missile and transfers control to block 52 which ends the target detection method.

In block 48 the new current time is set equal to the current time plus the time step, DT, in block 48 to prepare for the next cycle. The values of $X'_{0s}$, $Y'_{0s}$, $Z'_{0s}$ replace the values of $X_{1s}$, $Y_{1s}$, $Z_{1s}$ in Equation (4) for the next step of the process. Block 48 then transfers control to block 24 to iterate the collection of data for the fore and aft beams at the current time.

The present centroid target detection method operates in the spatial domain thereby observing the spatial relationships between the target and the estimated warhead burst time. Since this target detection method develops an image of the target as the target passes through the detection pattern, elimination of false detection of the target extremities is provided and therefore the target is accurately detected. Therefore the centroid or target aim point is more accurately located and the missile warhead may provide a higher degree of lethality to the target.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a fuzing arrangement of a missile, a target detection method comprising the steps of:
   receiving ranging, elevation, and azimuth information relating to a detected target at a first time;
   converting the ranging, elevation, and azimuth information to a plurality of orthogonal planes of Cartesian coordinates;
   incrementing the first time to a succeeding time;
   iterating the steps of receiving, converting, and incrementing for a plurality of succeeding times;
   predicting Cartesian coordinates of a centroid of the target based upon the planes of Cartesian coordinates of the target;
   combining the Cartesian coordinates of the predicted centroid with the Cartesian coordinates of a currently measured centroid of the target; and
   providing an indication to the fuzing arrangement that the centroid of the target is in proximity to the missile.

2. A target detection method as claimed in claim 1, wherein the step of predicting includes the step of combining the Cartesian coordinates for each of the plurality of planes.

3. A target detection method as claimed in claim 1, wherein the step of receiving includes the step of receiving the ranging, elevation, and azimuth information relating to the target from a plurality of detection beams of the missile.

4. A target detection method as claimed in claim 3, wherein there is further included the step of iterating the steps of receiving, converting, incrementing, and iterating until a detonation of a warhead of the missile occurs.

5. A target detection method as claimed in claim 4, wherein there is further included the steps of:
   determining whether the target has been detected; and
   iterating the step of incrementing for each of the detection beams, if the target has not been detected.

6. A target detection method as claimed in claim 5, wherein there is further included the steps of:
   determining which of the plurality of detection beams has the greatest number of detections of the target, if the target has been detected; and
   computing the minimum tracking time from the missile to one of said plurality of detection beams with the greatest number of target detections.

7. A target detection method as claimed in claim 6, wherein there is further included the steps of:
   determining a detonation time of a warhead of the missile; and
   determining the aim position coordinates of the target.

8. A target detection method as claimed in claim 7, wherein there is further included the step of indicating that the warhead is to be detonated.

9. A target detection method as claimed in claim 8, wherein there is further included the step of detonating the warhead of said missile.

10. A target detection method as claimed in claim 8, wherein there is further included the steps of:
    incrementing the succeeding time to a new time; and
    iterating said steps of receiving, converting, incrementing, and iterating, if the warhead has not been detonated.

11. A target detection method as claimed in claim 1, wherein the step of combining the Cartesian coordinates of the predicted centroid with the Cartesian coordinates of the currently measured centroid of the target includes the step of averaging the Cartesian coordinates of the predicted centroid with the Cartesian coordinates of the currently measured centroid of the target for each of said plurality of orthogonal planes.

12. In a fuze of a projectile, a target detection method comprising the steps of:
    repeatedly receiving ranging, elevation, and azimuth information relating to a detected target;
    converting the ranging, elevation, and azimuth information to a plurality of orthogonal planes of Cartesian coordinates;
    determining, at intervals, Cartesian coordinates for a current position of the centroid of the target;
    predicting Cartesian coordinates of the centroid of the target based upon the Cartesian coordinates of the current position of the target, for a next succeeding time interval;
    averaging the Cartesian coordinates of the predicted centroid with the Cartesian coordinates of the current position of the centroid of the target to produce a best approximation of the centroid of the target; and
    indicating when the best approximation of the centroid of the target is spatially near to the projectile.

13. A target detection method as claimed in claim 12, wherein the step of receiving includes the step of receiving the ranging, elevation, and azimuth information relating to the target from a plurality of detection beams of the projectile.

14. A target detection method as claimed in claim 13, wherein there is further included the steps of:
    determining whether the target has been detected; and
    iterating the steps of receiving, converting, incrementing, iterating, iterating and determining for each of the detection beams, if the target has not been detected.

15. A target detection method as claimed in claim 14, wherein there is further included the steps of:
    determining which of the plurality of detection beams has the greatest number of detections of the target, if the target has been detected; and computing the minimum tracking time from the missile to one of said plurality of detection beams with the greatest number of target detections.

16. A target detection method as claimed in claim 15, wherein there is further included the steps of:
   determining a detonation time of a warhead of the projectile; and
   determining the aim position coordinates of the target.

17. A target detection method as claimed in claim 16, wherein there is further included the step of indicating that the warhead is to be detonated.

18. A target detection method as claimed in claim 17, wherein there is further included the step of detonating the warhead of said projectile.

19. A target detection method as claimed in claim 17, wherein there is further included the steps of:
   incrementing the next succeeding time to a new time; and
   iterating said steps of receiving, converting and incrementing, if the warhead has not been detonated.

20. A target detection method as claimed in claim 17, wherein there is further included the step of computing an aim direction for a directional pattern warhead.

21. In a fuze of a projectile, a target detection method comprising the steps of:
   repeatedly receiving ranging, elevation, and azimuth information relating to a detected target;
   converting the ranging, elevation, and azimuth information to a plurality of orthogonal planes of Cartesian coordinates;
   determining, at intervals, Cartesian coordinates for a current position of the centroid of the target;
   predicting Cartesian coordinates of the centroid of the target based upon the Cartesian coordinates of the current position of the target, for a next succeeding time interval;
   averaging the Cartesian coordinates of the predicted centroid with the Cartesian coordinates of the current position of the centroid of the target to produce a best approximation of the centroid of the target; and
   indicating when the best approximation of the centroid of the target is spatially near to the projectile;
   determining detonation time of a warhead relative to the target;
   determining the aim Cartesian coordinates of the target;
   determining whether the warhead detonation will produce a lethal effect upon the target; and
   detonating the warhead, if the warhead detonation will produce a lethal effect upon the target.

* * * * *